(12) United States Patent
Messer

(10) Patent No.: US 9,311,208 B2
(45) Date of Patent: Apr. 12, 2016

(54) SYSTEM AND METHOD FOR GENERATING FIELD REPLACEABLE UNIT INFORMATION FILES

(71) Applicant: AMERICAN MEGATRENDS, INC., Norcross, GA (US)

(72) Inventor: Jason Andrew Messer, Jefferson, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 375 days.

(21) Appl. No.: 13/963,820

(22) Filed: Aug. 9, 2013

(65) Prior Publication Data
US 2015/0046761 A1 Feb. 12, 2015

(51) Int. Cl.
G06F 11/00 (2006.01)
G06F 11/30 (2006.01)
G06F 13/36 (2006.01)

(52) U.S. Cl.
CPC .......... *G06F 11/3051* (2013.01); *G06F 11/00* (2013.01); *G06F 13/36* (2013.01)

(58) Field of Classification Search
USPC ............. 710/8, 10, 15, 19, 62, 305, 313, 315; 709/220, 221
See application file for complete search history.

(56) References Cited

U.S. PATENT DOCUMENTS

| 5,293,556 | A * | 3/1994 | Hill et al. ................. 702/184 |
| 7,168,007 | B2 * | 1/2007 | Gilstrap et al. ............ 714/37 |
| 7,350,115 | B2 * | 3/2008 | Mathew et al. ............ 714/46 |
| 7,603,585 | B2 * | 10/2009 | Brinkmeyer et al. ........ 714/30 |
| 2003/0154312 | A1 * | 8/2003 | Berglund et al. .......... 709/250 |
| 2004/0228063 | A1 * | 11/2004 | Hawkins et al. .......... 361/115 |
| 2004/0230866 | A1 * | 11/2004 | Yates et al. .............. 714/25 |
| 2005/0005268 | A1 * | 1/2005 | Zilavy et al. ............ 717/170 |
| 2005/0021260 | A1 * | 1/2005 | Robertson et al. ........ 702/75 |
| 2005/0091438 | A1 * | 4/2005 | Chatterjee .............. 710/315 |
| 2005/0258241 | A1 * | 11/2005 | McNutt et al. .......... 235/385 |
| 2006/0167919 | A1 * | 7/2006 | Hsieh ................... 707/101 |
| 2007/0089446 | A1 * | 4/2007 | Larson et al. .......... 62/259.2 |
| 2008/0307502 | A1 * | 12/2008 | Hung ..................... 726/4 |
| 2012/0271983 | A1 * | 10/2012 | Chen et al. ............. 711/103 |
| 2013/0204984 | A1 * | 8/2013 | Meyer et al. ............ 709/220 |
| 2014/0122753 | A1 * | 5/2014 | Chiu et al. .............. 710/74 |

OTHER PUBLICATIONS

IPMI Platform Management FRU Information Storage Definition v.1.0, Intel Corporation et al., Feb. 28, 2013.*
Managing and Monitoring High-Performance Computing Clusters with IPMI, Dell Inc, Oct. 2004.*

* cited by examiner

*Primary Examiner* — Khanh Dang
(74) *Attorney, Agent, or Firm* — Locke Lord LLP; Tim Tingkang Xia, Esq.

(57) ABSTRACT

Technologies are described herein for generating field replaceable unit (FRU) information files in a format that is readable by a management controller in accordance with IPMI such that the FRU and the management controller are interoperable. In particular, a FRU installation station is in operative communication with a general purpose computer comprising a FRU information conversion module. A script utilized by the FRU information conversion module is configured to receive FRU information relating to a specified FRU and convert the information FRU binary files or a FRU image binary. The FRU binary files or FRU image binary are then received by the FRU installation station where they are subsequently transmitted to the inventory device of the specified FRU storage space according to the specified IPMI standard.

20 Claims, 3 Drawing Sheets

SYSTEM AND METHOD FOR GENERATING FIELD REPLACEABLE UNIT INFORMATION FILES

FIELD

The present disclosure generally relates to generation of information files for use in incorporating modular field replaceable units (FRUs), which are incorporated into computers and other pieces of electronic equipment.

BACKGROUND

In early computer systems, it was often difficult or even impossible to replace certain hardware components, e.g., the power supply, memory, and I/O controllers, after the computer had been manufactured. For example, such components might be hardwired together and attempting to remove the components might irreversible damage the computer. In certain cases, it was possible to remove such components by breaking and re-establishing physical connections (e.g., by soldering); however, such processes were tedious and time-consuming and typically required a skilled technician.

Modern computer systems frequently incorporate field-replaceable units (FRUs), which are components such as the power supply, memory, and I/O controllers that can be replaced in the field (i.e., at user locations). These FRUs generally interface with a computer's modular hardware interfaces, and thus FRUs can typically be removed by a relatively unskilled technician. Removing an FRU may, for example, only require removing a few screws and extracting the FRU from the computer's housing.

Generally, FRUs communicate with a computer system's management controller, such as a baseboard management controller (BMC). FRUs communicate with the BMC (or other management controller) using the Intelligent Platform Management Interface (IPMI), which is the protocol and set of commands that allows the various FRUs and management controller to communicate. FRU information is generally stored in a FRU information device (e.g., EEPROM). While IPMI specifies the protocols and commands that allow the FRUs to communicate with the management controller, as well as recommending the storage organization of the FRU Information Device, FRU information must still be properly formatted such that it can be processed by the management controller.

Therefore, there is a long-felt but unresolved need for a system and method for efficiently and effectively generating FRU information data into a format that is readable by a management controller in accordance with IPMI such that the FRU and the management controller are interoperable.

SUMMARY

Technologies are described herein for generating field replaceable unit (FRU) information files in a format that is readable by a management controller in accordance with IPMI such that the FRU and the management controller are interoperable. In particular, according to one aspect, a FRU installation station is in operative communication with a general purpose computer comprising a FRU information conversion module. A script utilized by the FRU information conversion module is configured to receive FRU information relating to a specified FRU and convert the information FRU binary files or a FRU image binary. The FRU binary files or FRU image binary are then received by the FRU installation station where they are subsequently transmitted to the inventory device of the specified FRU storage space according to the specified IPMI standard.

One aspect of the present disclosure relates to a system comprising an information conversion module that comprises a processor and a non-volatile memory storing a computer-executable program that, when executed by the processor, is configured to read a script file comprising information relating to a field replaceable unit (FRU); determine a first indicator specifying a FRU information device area in accordance with an IPMI format; identify a second indicator specifying a value relating to the FRU information device area; generate a data unit comprising information corresponding to the value in accordance with the IPMI format; and write the data unit to a FRU image binary.

A further aspect of the present disclosure relates to a method comprising the steps of reading a script file comprising information relating to a FRU; determining a first indicator specifying a FRU information device area in accordance with an IPMI format; identifying second indicator specifying a value relating to the FRU information device area; generating a data unit comprising information corresponding to the value in accordance with the IPMI format; and writing the data unit to a FRU image binary. In one embodiment, the steps are carried out via an information conversion module comprising a processor.

A further aspect of the present disclosure relates to a non-transitory computer readable medium storing executable instructions configured to cause a computer system to execute a method comprising the steps of reading a script file comprising information relating to a field replaceable unit (FRU); determining a first indicator specifying a FRU information device area in accordance with an IPMI format; identifying a second indicator specifying a value relating to the FRU information device area; generating a data unit comprising information corresponding to the value in accordance with the IPMI format; and writing via the information conversion module the data unit to a FRU image binary. In one embodiment, the method steps are carried out via an information conversion module comprising a processor.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

These and various other features as well as advantages, which characterize the technologies presented herein, will be apparent from a reading of the following detailed description and a review of the associated drawings.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
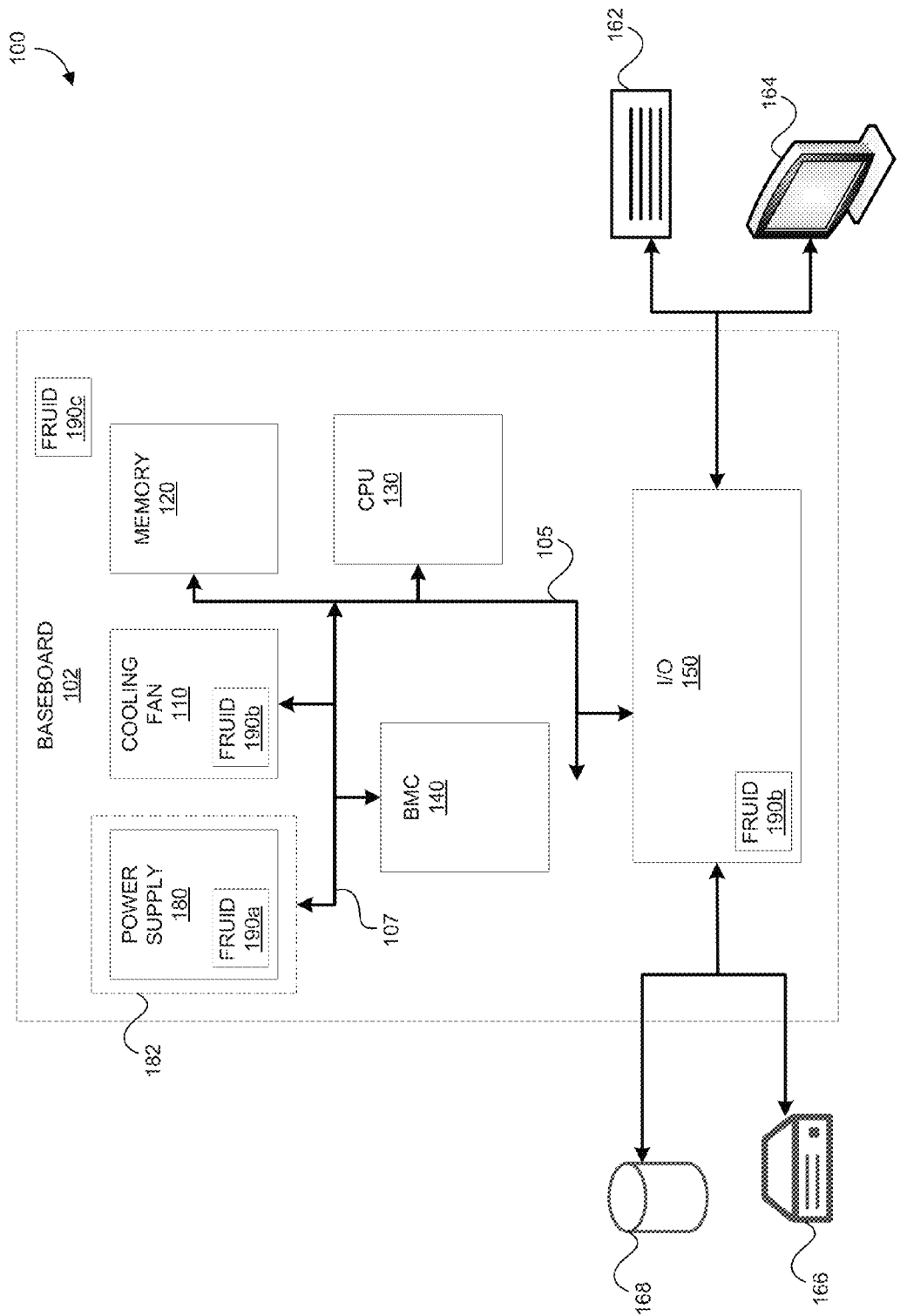
FIG. 1 schematically depicts an exemplary, stand-alone computer system, according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Referring now to FIG. 1, an exemplary computer system 100 configuration is shown. According to one embodiment, the computer system 100 is a stand-alone, general purpose computer system. Alternatively, the computer system 100 may be a special purpose computer system or a system that incorporates various interconnected systems, such as a client-server network. As will be understood by one of ordinary skill in the art, the computer system 100 of FIG. 1 only represents an exemplary embodiment and should not be considered to limit the disclosure in any manner.

As shown in the FIG. 1 embodiment, the computer system 100 has a motherboard or baseboard 102, which typically is a printed circuit board to which various components and devices may be connected by way of an electrical communication path such as a system bus 105. As shown in the FIG. 1 embodiment, the computer system 102 comprises various components, such as a cooling fan 110, memory 120, central processing unit (CPU) 130, baseboard management controller (BMC) 140, an input/output module 150, and a general-purpose power supply 180. While not shown, it is contemplated that a computer system could comprise various other components.

In certain embodiments, some of the components of the as the computer system 100 are interconnected with a simple bus-like interconnect such as a system bus 105. The system bus 105 typically serves as a communication path for connecting hardware components such as the CPU 130, memory 120, and input/output module 150. Typically, a system bus provides a two-way communication path for all components connected to the system bus. Further, in certain embodiments, the power supply 180, the cooling fan 110, and the BMC 140 are connected through a system management bus 107, which itself is connected to the system bus 105. In general, the component that initiates a communication on a bus is referred to as a "master" component and the component to which the initial communication is sent on the bus is referred to as a "slave" component. A master component therefore issues an initial command to or initially requests information from a slave component. Typically, each slave component is addressed, and thus communicatively accessible to master components, by a particular slave address. In general, both master components and slave components are operable to transmit and receive communications over a system bus.

Further, though not shown, it is typical that a computer system 100 comprises various sensors that monitor, for example, heal-related aspects associated with the computer system 100 (e.g., temperature, voltage across or applied to a system component, available capacity of a system memory device, etc.). Typically, the BMC 140 is communicatively coupled to such sensors via the system management bus 107, and the BMC 140 generally functions as the master, whereas the sensors function as the slaves. The BMC may also communicated with components such as the cooling fan 110 via the system management bus 107. Buses and the associated functionality of master-slave communications are well-known to those skilled in the art.

In certain embodiments, the general-purpose power supply 180 can be a FRU and can be removed from the power supply chassis 182. The power supply 180 can communicate with the baseboard 102 and various other components through the system management bus 107. The exemplary power supply 180 will be discussed further in relation to FIG. 2.

In certain embodiments, the CPU 130 is a standard central processor that performs arithmetic and logical operations necessary for the operation of the computer system 100. As will be understood, like many electrical components, the CPU 130 dissipates heat while operating, and thus cooling fan 110 is used to cool the CPU 130, according to one embodiment.

In certain embodiments, the I/O module 150 is connected to a keyboard 162, a display monitor 164, and various storage devices, such as, without limitation, a disk storage unit 166 and other external storage unit 168. Various other external components could be connected to the computer system 100 via the I/O module 150.

In certain embodiments, the input/output (I/O) module 150 allows for communication between any number and type of peripheral devices and the system bus 105. Generally, communications originating from a peripheral device and intended for the CPU 130, the BMC 140, or any other component coupled to the system bus 105 must pass through the I/O module 150 to the system bus 105 and then on to the intended component.

In general, the BMC 140, as shown in the FIG. 1 embodiment, is a microcontroller that monitors operation of the computer system 100. In certain embodiments, the BMC 104 monitors health-related aspects associated with the computer system 100, such as, the temperature of one or more components of the computer system 100, speed of rotational components (e.g., spindle motor, CPU Fan, etc.) within the system, the voltage across or applied to one or more components within the system, and the available or used capacity of memory devices within the system 100. Generally, the BMC 140 is communicatively connected to the various other components (e.g., CPU 130, cooling fan 110, or various others such as tachometers, heat sensors, voltage meters, amp meters, digital and analog sensors, etc.), and the components may also include sensor devices for measuring various operating and performance-related parameters within the computer system 100.

According to the present disclosure, the firmware of the BMC 140 adheres to the Intelligent Platform Management Interface (IPMI) industry standard. According to the FIG. 1 embodiment, the BMC 140 and associated firmware are part of a computer management subsystem composed of hardware, firmware, and various software for the purpose of autonomous monitoring, recovery, and control of the computer system's 100 health. In general, IPMI is a specification for hardware and firmware that monitors and controls a computer system 100 independently of the main processors and system management software or operating system (OS). The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC 120 through an operating system or through an external connection, such as through a network or serial connection. Additional details regarding IPMI can be found in the IPMI Specification (Version 2.0), which is publicly available from INTEL CORPORATION, and which is incorporated herein by reference.

Further, IPMI allows for quick and easy replacement of system components such as FRUs because, as noted, IPMI is an open standard hardware management interface specification that defines the manner in which unique devices can communicate with a BMC 140 or CPU 130 or other devices.

In general, the BMC 140 is the primary management controller in an IPMI implementation and typically provides the intelligence behind the IPMI. In certain embodiments, the BMC 140 manages the interface between system management software (i.e., system software that runs on the OS) and platform-management hardware and firmware. Further, the BMC provides autonomous monitoring, event logging, and recovery control while also serving as the gateway between system management software and the intelligent platform management bus (IPMB), which is the architecture, protocol, and implementation of a bus that supports IPMI. According to one embodiment, the IPMB is built on $I^2C$ and provides a communications path between various management controllers and other devices. Further, in one embodiment, the BMC 140 controls the System Event Log (SEL), Sensor Data Record (SDR) Repository, and BMC FRU and initialization information.

As noted, in certain embodiments, the BMC 140 monitors operating and performance-related parameters received from various components of the computer system 100 in order to determine whether an "event" is occurring within the system 100. For example, the BMC 140 may monitor operation of the CPU 130 (for example, by way of a CPU temperature sensor) and the cooling fan 110 to determine whether certain operating or performance related parameters exceed or fall below prescribed threshold ranges of operation, such as the temperature being dissipated by the cooling fan 110 exceeding a prescribed temperature.

According to one embodiment, the BMC 140 may also control one or more components of the computer system 100 in response to the occurrence of an event. For example, upon determining the temperature being dissipated exceeds a threshold, the BMC 140 may initiate operation of the cooling fan 110. In addition, it is contemplated that the BMC 140 may be connected to and receive sensed information from components connected directly to a contact pin of the BMC 140 or indirectly by way of a bus aside from the system bus 105 or other management bus.

Further, according to one embodiment, an IPMI comprises various components in addition to the BMC 140. Generally, an IPMI comprises an intelligent platform management bus (IPMB), which is an $I^2C$-based serial bus that is routed between various modules and components of the computer system 100. Additionally, an IPMI may comprise various private management buses, which can be $I^2C$ buses that are accessed via a management controller by using special IPMI commands for low-level $I^2C$ access.

Generally, management controllers such as the BMC 140 communicate with FRU devices and each other using IPMI commands over the IPMB. Non-intelligent devices, such as FRU inventory devices (which will be discussed below) do not understand IPMI commands; however, the FRU inventory devices can be accessed by a management controller such as a BMC 140 using a low-level $I^2C$ command (e.g., Master Write-Read $I^2C$).

As shown in the FIG. 1 embodiment and as previously discussed, the various computer system 100 components are designed as field-replaceable units (FRUs). As previously indicated, a FRU is a device assembly capable of being replaced quickly and easily in the field. Further, as previously indicated, FRU devices can be integrated into a computer system 100 via an IPMI implementation.

In certain embodiments, according to the IPMI standard, as shown in the FIG. 1 embodiment, the various FRU devices each include a FRU information device (also referred to herein as a "FRU inventory device" or "FRUID"), which is a storage device for storing inventory information related to each FRU. For example, the power supply 180 can have a FRUID 190a. The various other FRU devices can each have a FRUID 190b. The baseboard 102 can have a FRUID 190c. Typically, a FRUID is a non-intelligent device (e.g., EEPROM or SEEPROM chip) that does not understand IPMI commands. An EEPROM is an electrically erasable programmable read-only memory, which is a non-volatile memory used in computers or electronic devices to store small amounts of data that must be saved after power is removed from the device. Further, serial EEPROM (i.e., SEEPROM) is an EEPROM chip that uses a serial interface. In general, and as will be discussed further in relation to FIG. 2, non-volatile FRU inventory information includes, at a minimum, a serial number associated with the FRU, a part number associated with the FRU, and revision information, as well as an asset tag, product name, chassis, and other implementation-specific information. The FRUID 190 may also include data relating to the FRU's operating history and service history.

As shown in the FIG. 1 embodiment, the baseboard 102 comprises a FRUID 190c. As configured, the baseboard itself can be a FRU and comprises various submodules (e.g., power supply 180, cooling fan 110, etc.), each of which can also be FRUs comprising their own FRUID. As configured, the baseboard 102 is detachable from the computer system 100. Further, the various submodules (e.g., power supply 180, cooling fan 110, etc.) are also field replaceable and can be removed from the baseboard 102, and hence the computer system 100.

Figure 2:
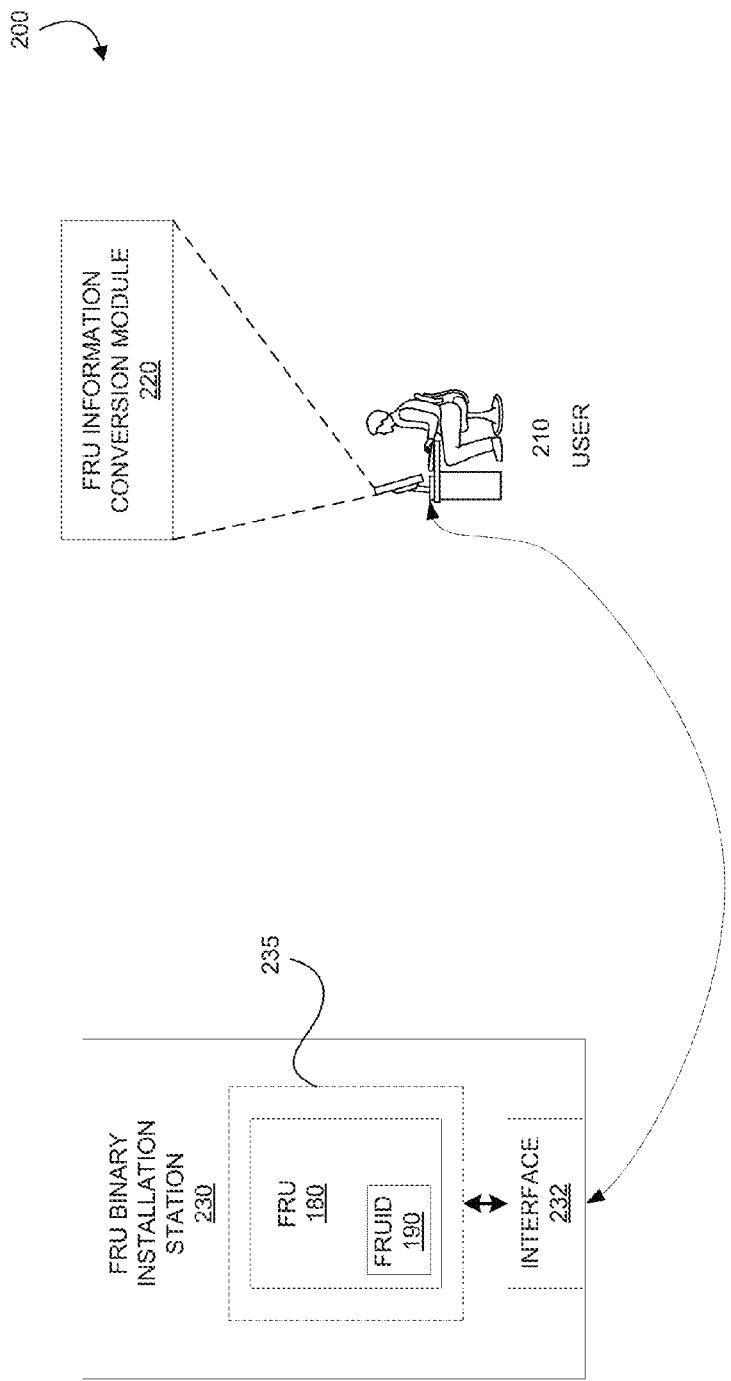
FIG. 2 illustrates a simplified illustration of a FRU installation station in operative communication with a general purpose computer implementing a FRU conversion module that utilizes a proprietary script language, according to one embodiment of the present disclosure.

Now moving to FIG. 2, an exemplary embodiment is displayed wherein a user 210 utilizes a FRU information conversion module 220 to configure a particular FRU device, e.g., power supply 180, with one or more files comprising FRU inventory information.

Figure 3:
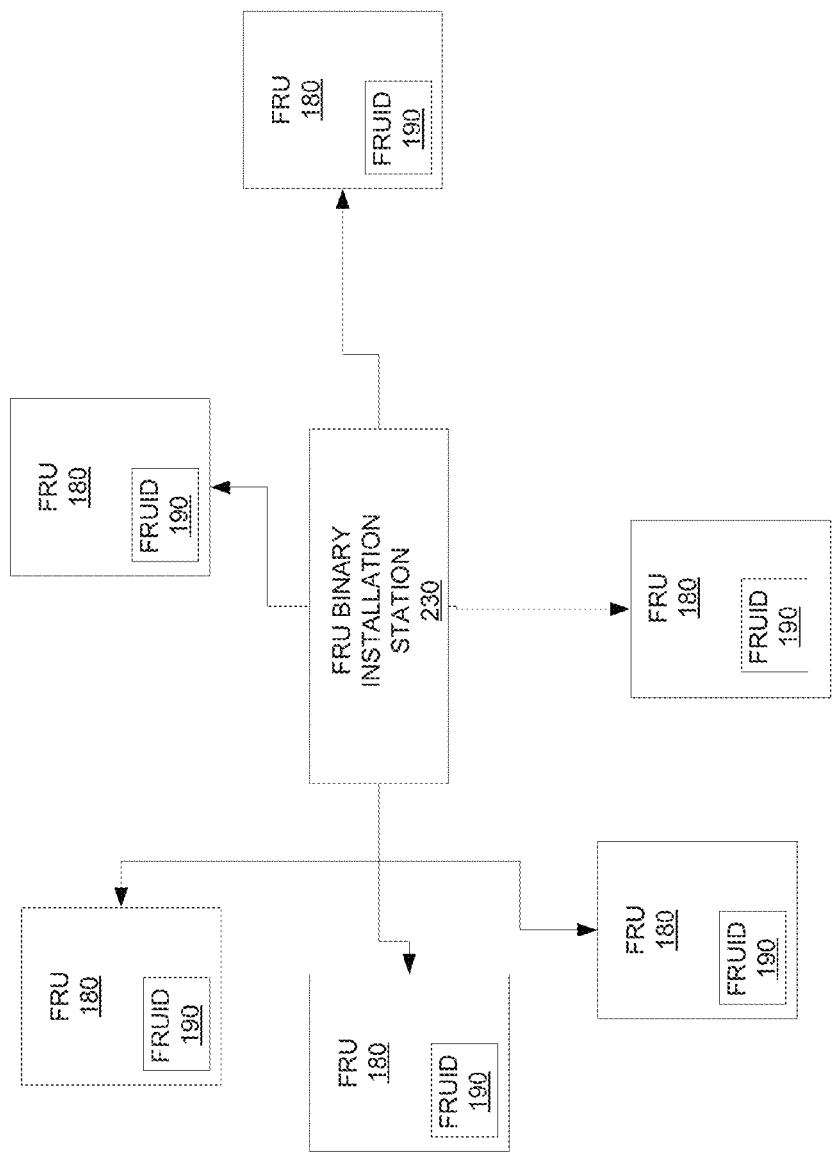
FIG. 3 illustrates a FRU installation station operatively connected to a plurality of FRU devices.

According to the FIG. 2 embodiment, a FRU installation station 230 is capable of interfacing with various FRU devices (e.g., power supplies, cooling fans, input/output boards, processing boards, system control boards, etc.). In the FIG. 2 embodiment, the FRU installation station 230 interfaces with a FRU (e.g., power supply 180) via the interface 235, which is configured to electronically transmit files comprising FRU inventory information to the attached FRU (e.g., 180) such that the FRU inventory information can be stored in the FRU inventory device (e.g., 190). In other words, the FRU installation station 230 has the necessary hardware components and software components that can be used to program EEPROM or SEEPROM chip or any other type of suitable memory chips used for FRUIDs. Further, though shown as interfacing with a single FRU in the FIG. 2 embodiment, as shown in the FIG. 3 embodiment, the FRU installation station 230 can be configured to interface with a plurality of FRUs at any given time.

As further shown in the FIG. 2 embodiment, the FRU installation station 230 is in operative communication with a general purpose computer having the FRU information conversion module 220 and utilized by a user 210. In the FIG. 2 embodiment, the computer connects to the FRU installation station 230 via an interface 232, such that the FRU installation station 230 can receive information from the FRU information conversion module 220. In an alternate embodiment, information generated by the FRU information conversion module 220 (i.e., digital data) may be stored to a storage medium (e.g., CD, CD-R, USB flash drive, etc.) and subsequently transferred to the FRU installation station 230.

As shown in the FIG. 2 embodiment, the FRU information conversion module 220 is configured to receive certain FRU information from a user 210 via a user interface and convert the information into a standardized format that is readable by a management controller such that the FRU and the management controller can communicate and are interoperable.

According to IPMI standards, each FRUID is divided into six information areas. The first area is the Common Header, which is mandatory for all FRU Information Device implementations, and is the starting point for accessing FRU information data. According to IPMI standards, the common header holds version information for the overall information format specification. Additionally, the common header offsets to the other information areas. Per IPMI standards, the other areas may or may not be present based on the application of the device. According to the standard, an area is specified as "null" or "not present" when the Common Header has a value of 00h for the starting offset for that area. The Common Header is present for all FRU information devices in a particular computer system, and the data in the Common Header provides the offsets to the other information areas in the device (as described below). Additionally, the Common Header includes a checksum such that the integrity of the header data can be verified.

The second area, according to IPMI standards, is the Internal Use Area. This area provides private, implementation-specific information storage for other devices that exist on the same FRU as the FRU information device. For example, in certain embodiments, a baseboard may be configured as a FRU with its own FRU information device. Various other FRU devices may also exist on the baseboard, and the Internal Use Area of the baseboard FRU includes information related to those other FRU devices. Generally, the Internal provides private non-volatile storage for a management controller such as the BMC 140.

The third area, according to the IPMI standards, is the Chassis Info Area, which is configured to hold serial number, part number, and other information about the system chassis. As indicated, a system can have multiple FRU information devices within a chassis, but only one device should provide the Chassis Info Area. Thus, this area will typically be absent from most FRU information devices. Ideally this information is in a FRU device that is part of a board that is associated with the chassis, such as a front panel or power distribution board. In many systems, however, such locations are not incorporated. Therefore, in certain embodiments, it is common to find the Chassis Info Area included in the FRU information for the baseboard.

The fourth area, per the IPMI standards, is the Board Info Area. The Board Info Area provides serial number, part number, and other information about the actual board upon which the FRU information device is located. As noted by the standard, the name "Board Info Area" is a bit of a misnomer as the usage is not restricted solely to circuit boards. The area also typically provides FRU information for any replaceable entities, boards, or sub-assemblies that are not sold as standalone products separate from other components (e.g., individual boards from a board set, or a sub-chassis or backplane that is part of a larger chassis). As also noted by the IPMI standard, the FRU device that provides info for the chassis is often implemented in the same physical device that provides FRU info for the overall product. In such cases, it may be common to have both a product info area and a chassis info area in the device's FRUID. This device may reside on the motherboard or on a chassis-related board, such as a circuit board for front panel controls. If the overall product and the chassis share the same basic identification information, it is often common to have duplicate fields between the records. If the chassis is orderable as a separate replacement part of the overall product, however, then the serial number and part number in the Chassis Info Area would typically be different than that for the overall product. Further, since the Board Info Area provides a bit more info than the Chassis Info Area alone, it is also typical to include a Board Info Area along with the chassis info, though that's not mandatory.

The fifth area, according to the IPMI standard, is the Product Info Area. The Product Info Area is present where the FRU itself is a separate product, such as would be the case with the power supply 180. Other examples of FRUs that are separate products include add-in cards and sub-assemblies. When the Product Info Area is provided in the FRUID that also contains the Chassis Info Area, the product information is for the overall system as it was initially manufactured.

The Chassis Info Area, Board Info Area, and Product Info Area each contain a number of variable-length fields. According to the standard, each of the fields is preceded by a type/length byte that indicates the length of the field and the type of encoding that is used for that particular field. The leading fields in each area serve predefined functions, and each can be followed by "custom" fields that are defined by the OEM or by manufacturing. This same variable-length field format is used for records within the MultiRecord Area (discussed below).

The sixth and final area, per the IPMI standard, is the MultiRecord Info Area. This area provides a region that holds one or more records where the type and format of the information is specified in the individual headers for the records. This differs from the other information areas wherein the type and format of the information are implied by which offset is used in the first area (i.e., the Common Header). The MultiRecord Info Area also provides a mechanism for extending the FRU Information Specification to cover new information types without impacting the existing area definitions.

In addition to the six storage area, the IPMI standard provides a suggested 2K-bit EEPROM organization structure. According to the standard, the Common Header is 8 bytes, the Internal Use Area is 72 bytes, the Chassis Info Area is 32 bytes, the Board Info Area is 64 bytes, and the Product Info Area is 80 bytes, which is the minimum recommended allocation.

In general, applications accessing FRU inventory information begin by verifying the format version for the FRUID is a version supported by the application by extracting the format version information from the Common Header Area. Typically, the application then extracts the starting offset for the desired area from the Common Header Area and subsequently accesses the "header" information specified at the beginning of that area. Assuming the format version is correct, the application can proceed and access the data contained therein. Since fields within an area can be fixed length or variable length, applications generally "walk" the fields sequentially. Therefore, applications typically traverse all fields by walking individual fields until encountering an "end-of-fields" type/length byte (generally value C1h).

Typically, each field begins with a fixed number of predefined fields, which are then followed by a variable number of custom fields, which are optional. When fields are not used, a "NULL" or "Empty" version of the field remains as a placeholder, thus allowing the application to recognize the a particular field (i.e., the Nth field) as always having the same meaning.

In one embodiment, FRU information conversion module 220 receives various information relating to a particular FRU device (e.g., power supply 180), and the script language converts and formats the received information such that it adheres to the IPMI standard and recommended EEPROM organization. According to one embodiment, parses certain information relating to a particular FRU device and, based on the recognition of various indicators or characters, determines which information should be stored in the various FRUID areas, and converts the information accordingly, appending the information to include various offsets and identifiers as necessary such that the information conforms to the IPMI standard.

According to one embodiment, a FRU information conversion module 220 utilizes a script language that is capable of specifying a binary file (i.e., "FRU binary") or other information file that is formatted according to various IPMI standards and to be programmed in a FRUID. In one embodiment, the script language can be used to define what goes into the FRU binary and the format of the information. In one embodiment, the script language can be used to create a human-readable file for certain FRUIDs that may not be configured to receive FRU binaries.

In one embodiment, the FRU information conversion module 220 may utilize a script language that utilizes the following set of rules for encoding certain data that is both machine readable and/or human readable. In one embodiment, the FRU information conversion module 220 generates one or more computer-readable binary files containing certain FRU inventory information as described above in accordance with the IPMI standards. In particular, in one embodiment, the conversion module may generate a single FRU image binary, which includes a collection of data units or bytes representing information relating to a particular FRU. In one embodiment, the information (data units) in a FRU image binary is organized according to the common format as specified by IPMI Platform Management FRU Information Storage Definition v1.0, Document Revision 1.1, released Sep. 27, 1999 (i.e., the "specification"), which is incorporated by reference in its entirety. Generally, the FRU image binary comprises information relating to the six FRUID areas, as discussed above (i.e., Common Header Area, Internal Use Area, Chassis, Info Area, Board Info Area, Product Info Area, and MultiRecord Info Area).

In one embodiment, the FRU information conversion module 220 generates fields relating to the Common Header Area. In one embodiment, one field relating to the Common Header Area identifies the format and version number of the specification. Accordingly, in one embodiment, the FRU information conversion module generates a field as "00000001" to signify use of the specification. Other fields relating to the Common Header Area include Internal Use Area Starting Offset, Chassis Info Area Starting Offset, Boarde Area Starting Offset, Product Area Starting Offset, MultiRecord Area Starting Offset, PAD, and a Common Header Checksum.

According to one embodiment, the set of rules relating to encoding FRU information relating to the Internal Use Area and generating one or more information files for the FRU image binary is as follows:

```
///////////////////////////////////////////////////
// Internal Use Area
//
// CustomDataFile: filename of binary file containing internal
// use data.
//   example: CustomDataFile = "somefile.bin"
//   notes: cannot be used with CustomDataString (one or the
//   other, but not both)
//
// CustomDataString: string to be inserted into the internal use
// data.
//   example: CustomDataString = "123"
//   notes: cannot be used with CustomDataFile (one or the
//   other, but not both).
//
///////////////////////////////////////////////////
///////////////////////////////////////////////////
//InternalUseArea
// {
//     CustomDataFile = "intdata.bin"
//     CustomDataString = "somecustomstring"
// }
///////////////////////////////////////////////////
```

According to one embodiment, after generating Common Header Area fields, the program parses the received information file and checks for a particular identifier, token, or tag that signifies a particular FRUID area to which the information immediately following relates. For example, according to one aspect, when the program encounters a tag such as <InternalUseArea> or "InternalUseArea", the program recognizes that the information that follows relates specifically to the Internal Use Area. According to the present embodiment, upon encountering the FRUID area identifier (e.g., <InternalUseArea>), the program generates a first field (i.e., FRU image binary byte) to identify the version of the specification (i.e., "00000001") being utilized.

In one embodiment, the program then checks for a subsequent identifier of information relating to the FRUID area. For example, in one embodiment, the program encounters the identifier <CustomDataFile> or "CustomDataFile", which is followed by the name and storage location of the particular file (i.e., intdata.bin). The program then retrieves the particular file from the location as specified, and writes the information contained in the particular file to the FRU image binary, according to one embodiment. In certain embodiments, the identifier will be followed by the name of the particular parameter or value, but no location information, in which case the program retrieves the parameter or value from a default location. In certain embodiments, the identifier may instead be followed by the actual information (e.g., parameter or value), in the form of a data string, in which case no retrieval is necessary. Instead, the data string (e.g., "somecustomstring") can be written directly to the FRU image binary. As will be discussed below, in one embodiment, the program generates a type/length byte that is also written to the FRU binary image and precedes the byte(s) comprising the parameter or value. As will be understood, the various parameters or values relate to various internal use data that are defined and formatted according to the device that utilizes or owns the Internal Use Area.

In one embodiment, the set of rules relating to encoding FRU information relating to the Chassis Info Area and generating one or more information files is as follows:

```
///////////////////////////////////////////////////
// Chassis Info Area
//
// Type - chassis type enumeration.
//   hex example: Type = 0x11
//   decimal example: Type = 17
//   values:
//       1 - Other
//       2 - Unknown
//       3 - Desktop
//       4 - Low Profile Desktop
//       5 - Pizza Box
//       6 - Mini Tower
//       7 - Tower
//       8 - Portable
//       9 - LapTop
//       10 - Notebook
//       11 - Hand Held
//       12 - Docking station
//       13 - All in One
//       14 - Sub Notebook
//       15 - Space-saving
//       16 - Lunch Box
//       17 - Main Server Chassis
//       18 - Expansion Chassis
//       19 - SubChassis
//       20 - Bus Expansion Chassis
//       21 - Peripheral Chassis
//       22 - RAID Chassis
//       23 - Rack Mount Chassis
//
// SerialNum - chassis serial number in quotes.
//   example: SerialNum = "123"
//
// PartNum - chassis part number in quotes.
//   example: PartNum = "123"
//
// CustomDataFile - filename of binary file containing one custom
// chassis info field.
//   example: CustomDataFile = "customdata.bin"
//   notes:
//     -type/length will be set to binary/unspecified by FRU
//     information conversion module
//     -cannot be used with CustomDataString (one or the other, but
//     not both)
//     - only one custom chassis info field is supported (not multiple)
//
```

```
// CustomDataString - string to insert into the custom chassis info
// field.
//    example: CustomDataString = "ABC123"
//    notes:
//      - type/length byte type fields will be set to 8-bit ascii + latin
// 1 by FRU information conversion module
//      - cannot be used with CustomDataFile (one or the other, but not
// both)
//////////////////////////////////////////////////////
//////////////////////////////////////////////////////
//ChassisInfoArea
// {
//     Type = 17
//     SerialNum = "xxxxxxx"
//     PartNum = "xxxxxxx"
//        CustomDataFile = "chasdata.bin"
//        CustomDataString = "someustomstring"
// }
//////////////////////////////////////////////////////
```

According to one embodiment, after generating Internal Use Area fields, the program continues to parse the received information file and checks for an additional identifier or tag that signifies another FRUID area to which the information immediately following relates. In one embodiment, when the program encounters a tag such as <ChassisInfoArea> or "ChassisInfoArea", the program recognizes that the information that follows relates specifically to the Chassis Info Area. Again, according to the present embodiment, upon encountering the FRUID area identifier (e.g., <ChassisArea>), the program generates a first field to identify the version of the specification (i.e., "00000001") being utilized.

As discussed, in one embodiment, the program then checks for a subsequent identifier of information relating to the Chassis Info Area. For example, in one embodiment, the program encounters an identifier relating to the particular type of chassis utilized by the particular FRU. For example, the identifier <Type> or "Type" may be followed by a decimal or hexadecimal value that identifies a particular chassis type. For example, according to one embodiment, decimal value 17 or equivalent hexadecimal value 0x11 specify a "Main Server Chassis" chassis type, and the program generates a field to be added to the FRU image binary indicating same. Various chassis types and their respective identifiers are specified above, according to the present embodiment.

In one embodiment, the program further parses the received information for an identifier or tag associated with a Chassis Part Number and/or Chassis Serial Information. Upon encountering either, the program generates the appropriate bytes for inclusion in the FRU image binary. According to one embodiment, the program first generates a type/length byte that indicates to, for example, the BMC 140 the type of information that will follow (i.e., binary or ASCII+Latin 1) as well as the number of bytes that will comprise the serial number or part number. In one embodiment, bits 7:6 provide a type code wherein 00 specifies that the serial number or part number formatted as binary and further wherein 11 specifies ASCII+Latin 1. Therefore, if the program encountered an identifier for the chassis serial number (e.g., SerialNum) followed be a data string (e.g., 67849189), in one embodiment, the program would first generate a type/length byte such as "11000001" to indicate that the serial number was formatted as ASCII+Latin 1 and that the bits comprising the serial number (i.e., 67849189) would comprise the following single byte.

According to one embodiment, in addition to the part and serial numbers, the program may encounter one or more identifiers for Custom Chassis Info fields (e.g., <CustomDataFile> or "CustomDataString"). As previously discussed, in one embodiment, such identifiers are followed by the name and storage location of a particular parameter (e.g., chastage-.bin) or by the value itself (e.g., "someustomstring"). As discussed above, in one embodiment, the program first generates a type/length byte and then generates the subsequent bytes that comprise the parameter or value. Further, according to one embodiment, the program generates a type/length byte that is encoded to indicate there are no subsequent information fields relating to the Chassis Info Area (e.g., C1h), fills any remaining unused space with 00h, and generates a Chassis Info Checksum, all of which are added to the FRU image binary.

In one embodiment, the set of rules relating to encoding FRU information relating to the Board Info Area and generating one or more information files is as follows:

```
//////////////////////////////////////////////////////
// Board Info Area
//
// Notes:
//     - mfg. date/time are handled automatically by FRU information
//     conversion module; confirm the time is correctly set on the
//     computer system used to implement FRU information conversion mod-
// ule
//     - fru file id is forced to null
//
// Manufacturer - board manufacturer name in quotes
//     example: Manufacturer = "ABC"
//
// ProductName - board product name in quotes
//     example: Product = "XYZ"
//
// SerialNum - board serial number in quotes
//     example: SerialNum = "123"
//
// PartNum - board part number in quotes
//     example: PartNum = "789"
//
// CustomDataFile - filename of binary file containing one custom
// manufacturing information field
//     example: CustomDataFile = "customdata.bin"
//     notes:
//       - type/length will be set to binary/unspecified by FRU
//     information
//     conversion module and should not be in the data file
//       - cannot be used with CustomDataString (one or the other, but not
//     both)
//       - only one custom manufacturing info field is supported (not
//     multiple)
//
// CustomDataString - string to insert into the custom manufacturing
// info field
//     example: CustomDataString = "ABC123"
//     notes:
//       - type/length byte type fields will be set to 8-bit ascii + latin
//     1 by FRU information conversion module
//       - cannot be used with CustomDataFile (one or the other, but not
//     both)
//
//////////////////////////////////////////////////////
//////////////////////////////////////////////////////
//BoardInfoArea
// {
//       Manufacturer = "Your Board Manufacturer"
//       Product Name = "Your Board Name"
//       SerialNum = "xxxxxxx"
//       PartNum = "xxxxxxx"
//          CustomDataFile = "brddata.bin"
//          CustomDataString = "somecustomstring"
// }
//////////////////////////////////////////////////////
```

According to one embodiment, subsequent to generating the Chassis Info Area bytes, the program continues parsing the received information file and checks for an identifier or tag relating to the Board Info Area (e.g., <BoardInfoArea> or "BoardInfoArea"). As previously discussed, in one embodiment, upon encountering an identifier relating to the Board Info Area, the program generates a byte to identify the version of the utilized specification (i.e., "00000001").

As discussed in relation to the Chassis Info Area above, the program then parses the information for certain board-related information identifiers such as, for example, manufacturer, product name, serial number, part number, etc. As discussed above, in one embodiment, upon encountering such an identifier, the program first generates a type/length byte associated with the value or parameter which is then followed by one or more bytes comprising the value or parameter. According to one embodiment, the Board Info Area also includes information relating to the data and time of the board's manufacture, and the program generates a corresponding byte accordingly that is written to the FRU image binary. Further, in one embodiment, the Board Info Area may comprise certain custom manufacturing information fields that are specified by the manufacturer and which must be preceded by a corresponding type/length byte, as previously discussed.

Further, as discussed in relation to the Chassis Info Area, the program generates a type/length byte that is encoded to indicate there are no subsequent information fields relating to the Chassis Info Area (e.g., C1h), fills any remaining unused space with 00h, and generates a Board Area Checksum, all of which are added to the FRU image binary.

In one embodiment, the set of rules relating to encoding FRU information relating to the Product Info Area and generating one or more information files is as follows:

```
//////////////////////////////////////////////////
// Product Info Area
//
// Notes:
//      - fru file id is forced to null
//
// Manufacturer - product manufacturer name in quotes
//      example: Manufacturer = "ABC"
//
// ProductName - product name in quotes
//      example: Product = "XYZ"
//
// SerialNum - product serial number in quotes
//      example: SerialNum = "123"
//
// PartNum - product part number in quotes
//      example: PartNum = "789"
//
// CustomDataFile - filename of binary file containing one custom
// product information field
//      example: CustomDataFile = "customdata.bin"
//      notes:
//         - type/length will be set to binary/unspecified by FRU
//      information
//      conversion module and should not be in the data file
//         - cannot be used with CustomDataString (one or the other, but not
//      both)
//         - only one custom product info field is supported (not multiple)
//
// CustomDataString - string to insert into the custom product info
// field
//      example: CustomDataString = "ABC123"
//      notes:
//         - type/length byte type fields will be set to 8-bit ascii + latin
//      1 by FRU information conversion module
//         - cannot be used with CustomDataFile (one or the other, but not
//      both)
//
//////////////////////////////////////////////////
//////////////////////////////////////////////////
//ProductInfoArea
// {
//      Manufacturer = "Your Product Manufacturer"
//      Product Name = "Your Product Name"
//      SerialNum = "xxxxxxx"
//      Version = "1"
//      Asset Tag = "xx"
//         CustomDataFile = "brddata.bin"
//         CustomDataString = "somecustomstring"
// }
//////////////////////////////////////////////////
```

According to one embodiment, subsequent to generating the Board Info Area bytes, the program continues parsing the received information file and checks for an identifier or tag relating to the Product Info Area (e.g., <ProductInfoArea> or "ProductInfoArea"). As previously discussed, in one embodiment, upon encountering an identifier relating to the Product Info Area, the program generates a byte to identify the version of the utilized specification (i.e., "00000001").

As discussed in relation to the Chassis Info and Board Info Areas above, the program then parses the information for certain product-related information identifiers such as, for example, manufacturer, product name, serial number, part/model number, version, asset tag, etc. As discussed above, in one embodiment, upon encountering such an identifier, the program first generates a type/length byte associated with the value or parameter which is then followed by one or more bytes comprising the value or parameter. According to one embodiment, the Product Info Area may include a language code. According to one embodiment, the Product Info Area may comprise certain custom product information fields that are specified by the manufacturer and which must be preceded by a corresponding type/length byte, as previously discussed.

Further, as discussed previously, the program generates a type/length byte that is encoded to indicate there are no subsequent information fields relating to the Product Info Area (e.g., C1h), fills any remaining unused space with 00h, and generates a Board Area Checksum, all of which are added to the FRU image binary.

In each of the examples and as discussed, the script utilized by the FRU information conversion module 220 is configured to receive various information relating to a particular device and convert the information to one or more FRU binary files or a FRU image binary. As previously discussed, the FRU installation station 230 is configured to receive the FRU binary files or other information files (e.g., via USB connection, detachable USB storage device, CD, CD-R, etc.) and subsequently transmit the files to the FRUID 190a for storage according to the IPMI suggested EEPROM organization or other IPMI standard, as specified. As will be understood, the various rule sets provided above are exemplary and are in no way intended to be limiting. The FRU information conversion module and associated script language and rule set can be configured to receive and convert various other information relating to a FRU device.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data.

The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the inventions to the precise forms disclosed. Many modifications and variations are possible in light of the above teaching. The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system comprising
an information conversion module comprising a processor and a non-volatile memory storing a computer-executable program that, when executed by the processor, is configured to
receive an information file containing information related to a field replaceable unit (FRU) in a non-binary format, wherein the information related to the FRU comprises:
  a first indicator specifying a first FRU information device area from a plurality of FRU information device areas in accordance with an IPMI format; and
  a second indicator corresponding to the first indicator, and specifying at least one value for the first FRU information device area specified by the first indicator;
read a script file comprising conversion information specifying conversion of the information of the information file in the non-binary format to a binary format in accordance with the IPMI format;
based on the conversion information of the script file,
  parse the information file to obtain the first indicator and the second indicator;
  determine the first FRU information device area specified by the first indicator; and
  convert the at least one value specified by the second indicator to a first data unit in the binary format;
generate a FRU image binary comprising the plurality of the FRU information device areas in accordance with the IPMI format and using the first data unit being converted as a value stored in the first FRU information device area specified by the first indicator; and
write the FRU image binary to a FRU information device (FRUID) of the FRU.

2. The system of claim 1, wherein each of the first and second indicators is one or more of the following: identifier, token, and tag.

3. The system of claim 1, wherein the plurality of FRU information device areas comprises a Common Header Area, an Internal Use Area, a Chassis Info Area, a Board Info Area, a Product Info Area, and a MultiRecord Area.

4. The system of claim 3, wherein the first FRU information device area is the Internal Use Area, and further wherein the at least one value specified by the second indicator is internal use data.

5. The system of claim 4, wherein each of the at least one value specified by the second indicator is one of "CustomDataFile" and "CustomDataString".

6. The system of claim 3, wherein the first FRU information device area is the Chassis Info Area, and further wherein the at least one value specified by the second indicator is at least one of chassis type, chassis part number, chassis serial number, and custom chassis information.

7. The system of claim 6, wherein each of the at least one value specified by the second indicator is one of "Type", "SerialNum", "Part Num", "CustomDataFile", and "CustomDataString".

8. The system of claim 7, wherein the at least one value specified by the second indicator comprises "Type" and a value of "Type" identifies one of the following: other, unknown, desktop, low profile desktop, pizza box, mini tower, tower, portable, laptop, notebook, hand held, docking station, all in one, sub notebook, space-saving, lunch box, main server chassis, expansion chassis, subchassis, bus expansion chassis, peripheral chassis, RAID chassis, or rack mount chassis.

9. The system of claim 3, wherein the first FRU information device area is the Board Info Area, and further wherein the at least one value specified by the second indicator is at least one of manufacturing date and time, board manufacturer, board product name, board serial number, board part number, and custom manufacturing information.

10. The system of claim 9, wherein each of the at least one value specified by the second indicator is one of "Manufacturer", "Product Name", "SerialNum", "Part Num", "CustomDataFile", and "CustomDataString".

11. The system of claim 3, wherein the first FRU information device area is the Product Info Area, and further wherein the at least one value specified by the second indicator is at least one of manufacturer name, product name, product part number, product model number, product version, product serial number asset tag, and custom manufacturing information.

12. The system of claim 11, wherein each of the at least one value specified by the second indicator is one of "Manufacturer", "Product Name", "SerialNum", "Version", "Asset Tag", "CustomDataFile", and "CustomDataString".

13. The system of claim 1, wherein the information related to the FRU further comprises:
a third indicator specifying a second FRU information device area from the plurality of FRU information device areas in accordance with the IPMI format; and
a fourth indicator corresponding to the third indicator, and specifying at least one value for the second FRU information device area specified by the third indicator;

wherein the computer-executable program, when executed by the processor, is further configured to, based on the conversion information of the script file,
  parse the information file to obtain the third indicator and the fourth indicator;
  determine the second FRU information device area specified by the third indicator; and
  convert the at least one value specified by the fourth indicator to a second data unit in the binary format, wherein the second data unit being converted is used as a value stored in the second FRU information device area specified by the third indicator in the FRU image binary being generated.

14. The system of claim 3, wherein the first FRU information device area is the Common Header Area, and wherein the at least one value specified by the second indicator at least one of version information of the IPMI format, Internal Use Area Starting Offset, Chassis Info Area Starting Offset, Boarde Area Starting Offset, Product Area Starting Offset, Multi-Record Area Starting Offset, PAD, and a Common Header Checksum.

15. A method, comprising:
  receiving, via an information conversion module comprising a processor, an information file containing information related to a field replaceable unit (FRU) in a first non-binary format, wherein the information related to the FRU comprises:
    a first indicator specifying a first FRU information device area from a plurality of FRU information device areas in accordance with an IPMI format; and
    a second indicator corresponding to the first indicator, and specifying at least one value for the first FRU information device area specified by the first indicator;
  reading, via the information conversion module, a script file comprising conversion information specifying conversion of the information of the information file in the non-binary format to a binary format in accordance with the IPMI format;
  based on the conversion information of the script file,
    parsing, via the information conversion module, the information file to obtain the first indicator and the second indicator;
    determining, via the information conversion module, the first FRU information device area specified by the first indicator; and
    converting, via the information conversion module, the at least one value specified by the second indicator to a first data unit in the binary format;
  generating, via the information conversion module, a FRU image binary comprising the plurality of the FRU information device areas in accordance with the IPMI format and using the first data unit being converted as a value stored in the first FRU information device area specified by the first indicator; and
  writing, via the information conversion module, the FRU image binary to a FRU information device (FRUID) of the FRU.

16. The method of claim 15, wherein each of the first and second indicators is one or more of the following: identifier, token, tag.

17. The method of claim 15, wherein the plurality of FRU information device areas comprises a Common Header Area, an Internal Use Area, a Chassis Info Area, a Board Info Area, a Product Info Area, and a MultiRecord Area.

18. The method of claim 17, wherein the first FRU information device area is the Internal Use Area, and further wherein the at least one value specified by the second indicator is internal use data.

19. The method of claim 15, wherein the information related to the FRU further comprises:
  a third indicator specifying a second FRU information device area from the plurality of FRU information device areas in accordance with the IPMI format; and
  a fourth indicator corresponding to the third indicator, and specifying at least one value for the second FRU information device area specified by the third indicator;
  wherein the method further comprises, based on the conversion information of the script file,
    parsing, via the information conversion module, the information file to obtain the third indicator and the fourth indicator;
    determining, via the information conversion module, the second FRU information device area specified by the third indicator; and
    converting, via the information conversion module, the at least one value specified by the fourth indicator to a second data unit in the binary format, wherein the second data unit being converted is used as a value stored in the second FRU information device area specified by the third indicator in the FRU image binary being generated.

20. A non-transitory computer readable medium storing computer-executable instructions configured to cause a computer system to execute a method comprising:
  receiving, via an information conversion module comprising a processor an information file containing information related to a field replaceable unit (FRU) in a first non-binary format, wherein the information related to the FRU comprises:
    a first indicator specifying a first FRU information device area from a plurality of FRU information device areas in accordance with an IPMI format; and
    a second indicator corresponding to the first indicator, and specifying at least one value for the first FRU information device area specified by the first indicator;
  reading, via the information conversion module, a script file comprising conversion information specifying conversion of the information of the information file in the non-binary format to a binary format in accordance with the IPMI format;
  based on the conversion information of the script file,
    parsing, via the information conversion module, the information file to obtain the first indicator and the second indicator;
    determining, via the information conversion module, the first FRU information device area specified by the first indicator; and
    converting, via the information conversion module, the at least one value specified by the second indicator to a first data unit in the binary format;
  generating, via the information conversion module, a FRU image binary comprising the plurality of the FRU information device areas in accordance with the IPMI format and using the first data unit being converted as a value stored in the first FRU information device area specified by the first indicator; and
  writing, via the information conversion module, the FRU image binary to a FRU information device (FRUID) of the FRU.

* * * * *